(12) United States Patent
Pellican

(10) Patent No.: US 8,548,906 B1
(45) Date of Patent: Oct. 1, 2013

(54) METHOD AND APPARATUS FOR AUTOMATIC SAVINGS UPON EVENT DETECTION

(75) Inventor: Suzanne Y. Pellican, Menlo Park, CA (US)

(73) Assignee: Intuit Inc., Mountain View, CA (US)

( * ) Notice: Subject to any disclaimer, the term of this patent is extended or adjusted under 35 U.S.C. 154(b) by 571 days.

(21) Appl. No.: 12/019,193

(22) Filed: Jan. 24, 2008

(51) Int. Cl.
*G06Q 40/00* (2012.01)

(52) U.S. Cl.
USPC .............................. 705/39; 705/40; 705/42

(58) Field of Classification Search
USPC .............................................. 705/39, 40, 42
See application file for complete search history.

(56) References Cited

U.S. PATENT DOCUMENTS

| | | | | |
|---|---|---|---|---|
| 5,913,029 A | * | 6/1999 | Shostak | 709/203 |
| 6,149,055 A | * | 11/2000 | Gatto | 235/379 |
| 6,272,472 B1 | * | 8/2001 | Danneels et al. | 705/27 |
| 6,431,439 B1 | * | 8/2002 | Suer et al. | 235/380 |
| 2006/0026030 A1 | * | 2/2006 | Jacobs | 705/1 |
| 2007/0033134 A1 | | 2/2007 | Carretta et al. | |

* cited by examiner

*Primary Examiner* — Nga B. Nguyen
(74) *Attorney, Agent, or Firm* — Park, Vaughan, Fleming & Dowler, LLP

(57) ABSTRACT

Method and apparatus for automatic savings upon event detection. An electronic transfer of funds from one financial account to another financial account is performed in response to selection of a user interface element to a computer software program. For example, a user may initiate the transfer of a fixed, relatively small amount from a checking account to a savings account by selecting a user interface element configured to initiate a funds transfer transaction. Each time the user selects the user interface element, a new funds transfer transaction is generated and transmitted to a financial institution's computer system(s) via a network. Thus, for example, a user may quickly and easily transfer relatively small, fixed amounts of funds from checking into savings without changing the current context of the computer software program.

24 Claims, 9 Drawing Sheets

US 8,548,906 B1

METHOD AND APPARATUS FOR AUTOMATIC SAVINGS UPON EVENT DETECTION

BACKGROUND

Conventional online mechanisms for transferring funds from one financial account such as a checking account to another financial account such as a savings account typically require a user to navigate to a specific "funds transfer" section, page or display, specify source and destination accounts, specify an amount to be transferred, confirm the transaction, and then navigate back to another area of interest, each time the user wants to transfer funds from one financial account to another financial account, for example from a checking account to a savings account.

A conventional savings model is to transfer at least a portion of whatever money is available from checking to savings periodically, or at the end of a financial period, for example at the end of the month. A person may, for example, discover at the end of the month that there is $150 in "extra" money left over, which could be saved by transferring the $150 to a savings account. However, human nature is such that many individuals may find something on which to spend that "extra" money or a portion of the money rather than saving the money. Thus, many people may find that they tend to spend some or all of the "extra" money rather than transferring the funds to a savings account.

SUMMARY

Various embodiments of a method and apparatus for automatic savings upon event detection are described. In embodiments, an electronic transfer of funds from one financial account to another financial account may be automatically performed in response to detection of an event such as a user interaction with a user interface to a computer software program. Embodiments may, for example, be directed at transferring fixed, relatively small amounts of money from a user's checking account with a financial institution to the user's savings account with the financial institution. Embodiments may enable the transferal of a fixed, relatively small amount of funds from a user's checking account to the user's savings account in response to each user interaction with a user interface element configured to initiate the funds transfer transaction. A savings account may be a conventional savings account, an investment account, a retirement account, or any other type of account intended to "put away", save or invest money. Thus, embodiments may allow users to quickly and easily transfer relatively small, fixed amounts of funds from checking into savings without changing the current context of the application that the user is using. Some embodiments may provide visual or other feedback, for example a user interface element or elements that textually or graphically shows the user how their savings account increases when each funds transfer transaction is initiated. Thus, embodiments may serve to encourage people to save money more regularly.

In embodiments, each time the user activates or selects a user interface element provided by a user interface to a program on a client device, a new funds transfer transaction is generated and transmitted to the financial institution's computer system(s). For example, if the user interface element is a "log in" user interface element, each time the user logs in to the program, a funds transfer is initiated. As another example, if the user interface element is a "save now" button displayed after the user has logged into the program, each time the user activates (e.g., clicks on or otherwise selects) the user interface element, a funds transfer is initiated. In one embodiment, the funds transfer may then be performed without prompting the user for confirmation. In another embodiment, the user may be prompted to confirm the funds transfer before the transaction is actually committed, thus allowing the user to selectively confirm or cancel initiated funds transfers.

In one embodiment, a user may select a user interface element displayed on a user interface to a computer program and configured to initiate a funds transfer for the user. For example, the user may hover the cursor over a user interface element, such as a "save now" user interface element, and click on the user interface element using a mouse button. As another example, the user may select a menu item from a pulldown or popup menu. In one embodiment, the user interface element may include an indication of the amount that will be transferred upon selection of the user interface element; for example, the user interface element may be a button that displays the text "Save $[amount] Now". In response to the user selection of the user interface element, a funds transfer transaction may be generated. In one embodiment, the software program may include a funds transfer software module that detects the user selection of the user interface element and generates the funds transfer transaction. The software program may be an application installed and run on the user's client device. Alternatively, the program may be a network-based ("online") program, application or service, such as an online financial service, that provides a user interface to the user's client device remotely via a network, for example via a web browser or web application on the client device.

The amount indicated by the funds transfer transaction may be transferred from an indicated source account to an indicated destination account in response to the funds transfer transaction. In one embodiment, the funds transfer transaction may be transmitted to a financial institution computer system via the network. In response to receiving the funds transfer transaction, the financial institution computer system may perform the electronic transfer of the indicated amount of funds from the indicated source account to the indicated destination account. In one embodiment, confirmation of the successful transfer (or, if necessary, indication that the transfer cannot be performed for some reason) may be communicated back to the user's client device via the network. In one embodiment, visual or other feedback may be provided to the user indicating the results of the transfer to the destination (e.g., savings) account. For example, in one embodiment, a user interface element may display the current amount of funds in the user's destination (e.g., savings) account, and the displayed amount may be updated to indicate the new amount in the account after the transfer.

Figure 1:
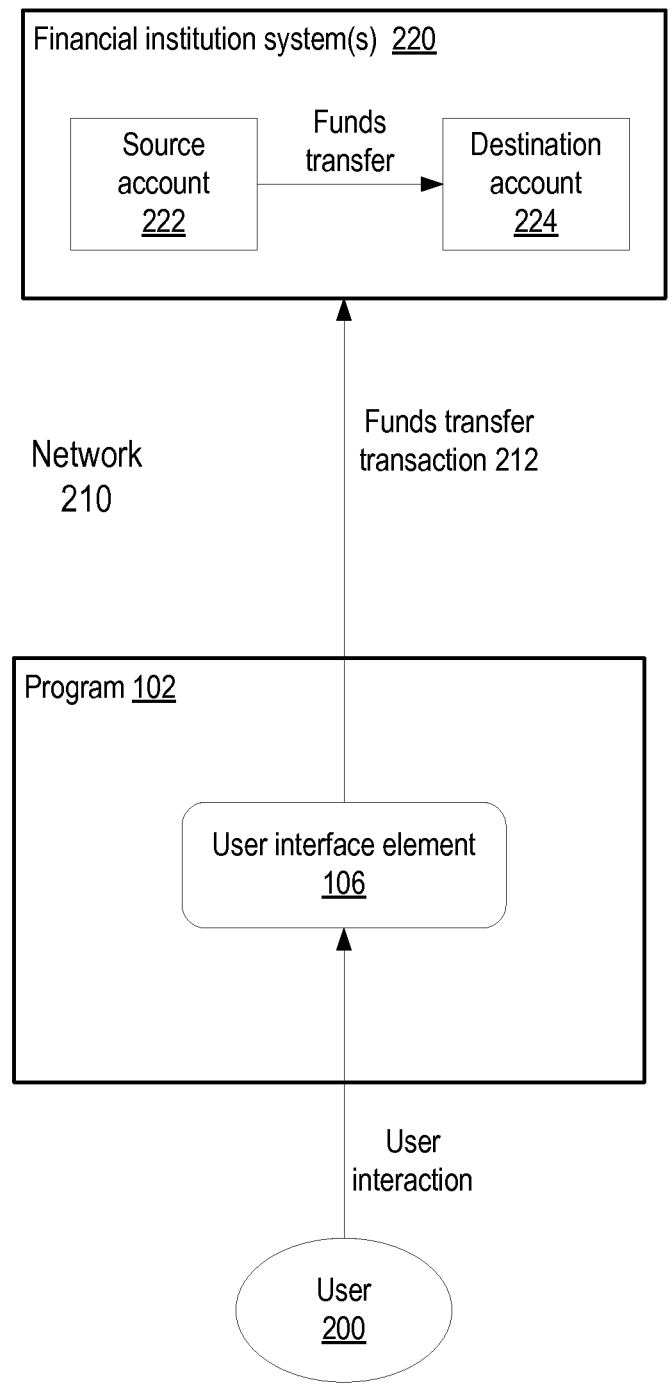
FIG. 1 is a high-level block diagram illustrating the electronic transfer of a fixed amount of funds from a source account to a destination account in response to a user interaction with a user interface element to a computer software program, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for automatic savings upon event detection are described. In embodiments, an electronic transfer of funds from one financial account to another financial account may be automatically performed in response to a user interaction with a user interface to a computer software program are described. Embodiments may, for example, be directed at transferring fixed, relatively small amounts of money from a user's checking account with a financial institution to the user's savings account with the financial institution. A user may be an individual, a small business, or in general any entity that may maintain multiple financial accounts. The financial institution may be a bank, credit union, or in general any institution that provides users with financial accounts and that provides an online presence or network interface that enables user access and electronic funds transfers. A savings account may be a conventional savings account, an investment account, a retirement account, or any other type of account intended to "put away", save or invest money.

Embodiments may enable the transferal of a fixed, relatively small amount of funds from a user's checking account to the user's savings account in response to each user interaction with a user interface element configured to initiate the funds transfer transaction. For example, the user interface element may be a "login" user interface element, such as a login button or menu item, that enables the transferal of funds in response to each login to an application, service, or web site. As another example, the user interface element may be a user interface element such as a desktop icon, menu item or "link" configured to startup (e.g., launch, initiate, open or access) a computer software program (e.g., a program, application, service, web page, web site, etc.). As yet another example, the user interface element may be a "save now" user interface element provided on one or more displays or pages provided by the software program. In one embodiment, the user interface element may include an indication of the amount that will be transferred upon selection of the user interface element; for example, the user interface element may display the text "Save $[amount] Now".

Embodiments are generally described herein as transferring a "fixed" amount upon user selection of a user interface element. "Fixed" refers to the user interface element being preconfigured to transfer a set amount, for example $1, $5, $10, and so on. In one embodiment, the user may be allowed to configure the amount to be transferred upon each selection of the user interface element, for example via a configuration process as described below in reference to element 402 of FIG. 10. In some embodiments, two or more user interface elements may be provided that enable the user to selectively initiate the transfer of different amounts. For example, in one embodiment, two or more "Save $[amount] Now" user interface elements may be displayed, with each user interface element specifying a different amount (e.g., $1, $5, $10, etc.). In some embodiments, rather than a fixed amount being automatically transferred upon each selection of a particular user interface element preconfigured to initiate the transfer of that fixed amount, the user may be allowed to select or specify an amount to be transferred in response to selection of the user interface element. For example, in one embodiment, selection of the user interface element may initiate the display of a user interface mechanism (e.g., a popup menu) via which the user may select an amount to be transferred from a list or menu of amounts (e.g., $1, $5, $10, $25, $50, or $100). Thus, in some embodiments, the user interface element may not be preconfigured to transfer a fixed amount, but instead may provide two or more amounts that the user may select from.

In some embodiments, other methods for determining an amount to be transferred upon detection of an event (e.g.: selection of a particular user interface element on a user interface provided by a computer software program; login to a program, application or service; startup (e.g., launch, initiation, access, opening) of a local or remote program, service, or application, etc.) may be used. In some embodiments, the amount to be transferred may be determined or calculated in accordance with a current balance in the user's source account, destination account, or both accounts. For example, the amount to be transferred may be determined as a percentage of the current balance in the user's savings account or the user's checking account. As another example, one or more thresholds may be specified. If the current balance of the account is under a particular threshold, a smaller amount (e.g., $2) is transferred; if the balance is over the particular threshold, a larger amount (e.g., $10) is transferred.

In embodiments, a user may initiate a funds transfer quickly and easily by simply initiating an event by selecting a user interface element that is preconfigured to transfer some amount, whether the amount is a particular fixed amount, is automatically calculated, e.g. from a balance of an account, is selected by the user from a list of amounts, or is determined by some other method. Embodiments may thus enable users (e.g., individuals or small businesses) to quickly and easily transfer funds from checking into savings without changing the current context of the application or program that the user is using, and in some cases without even having to think about it (as in the case of a program or application login-initiated or startup-initiated transfer). Furthermore, each time the user initiates the event by selecting the user interface element, a new funds transfer transaction to transfer the amount (however determined) is initiated; thus, the user may regularly or semi-regularly, as desired, initiate a transfer of funds from a source account (e.g., checking) into a destination account (e.g., savings). Conventional online mechanisms for transferring funds to savings accounts typically require a user to navigate to a specific "funds transfer" section, page or display, specify source and destination accounts, specify an amount to be transferred, confirm the transaction, and then navigate back to another area of interest, each time the user wants to transfer funds from checking to savings. Thus, embodiments, through ease of use, may encourage users to regularly transfer money to savings, whereas conventional online financial systems, through their complexity, may discourage users from saving.

In addition to the ease of use of embodiments, which may encourage users to more regularly transfer funds from checking to savings, a conventional savings model is to transfer at least a portion of whatever money is available from checking to savings periodically, or at the end of a financial period, for example at the end of the month. A person may, for example, discover at the end of the month that there is $150 in "extra" money left over, which could be, and perhaps should be, transferred to a savings account. However, human nature is such that many individuals may find something else to spend that "extra" money or a portion of the money on. Thus, many people may find that they tend to spend some or all of the "extra" money that they really should be transferring to a savings account. Embodiments as described herein enable a person to regularly or semi-regularly, throughout a financial period, e.g. throughout the month, transfer small amounts into savings without much effort or thought at all. Thus, at the end of the month, the person discovers that the balance in their savings account has increased, and at least some of the "extra" money that they might otherwise spend without saving is already safely in a savings account. Thus, embodiments may get people who are not disciplined enough to regularly save that "extra" money at the end of the month to start saving money regularly or semi-regularly throughout the month.

Furthermore, some embodiments may provide visual or other feedback, for example a user interface element or elements that textually or graphically shows the user how their savings account increases when each funds transfer transaction is initiated. This feedback itself may provide incentive to some people to save more.

While embodiments are generally described as performing an electronic transfer of funds from one financial account to another financial account in response to user selection of a user interface element, one embodiment may, instead of transferring funds from one account to another account, "transfer" the funds to a designated section or partition within a single account. In this embodiment, the account, for example a checking account, may be configured to have a section of the account designated as "hidden", or otherwise specially designated. In this embodiment, selection of the user interface element initiates the transfer of the amount from the "regular" section of the account into the specially designated section of the account. For example, if the account is a checking account, the amount may be transferred into a "hidden" section, and thus not show up in the balance of the account immediately available to draft checks against or withdraw directly from.

Figure 13:
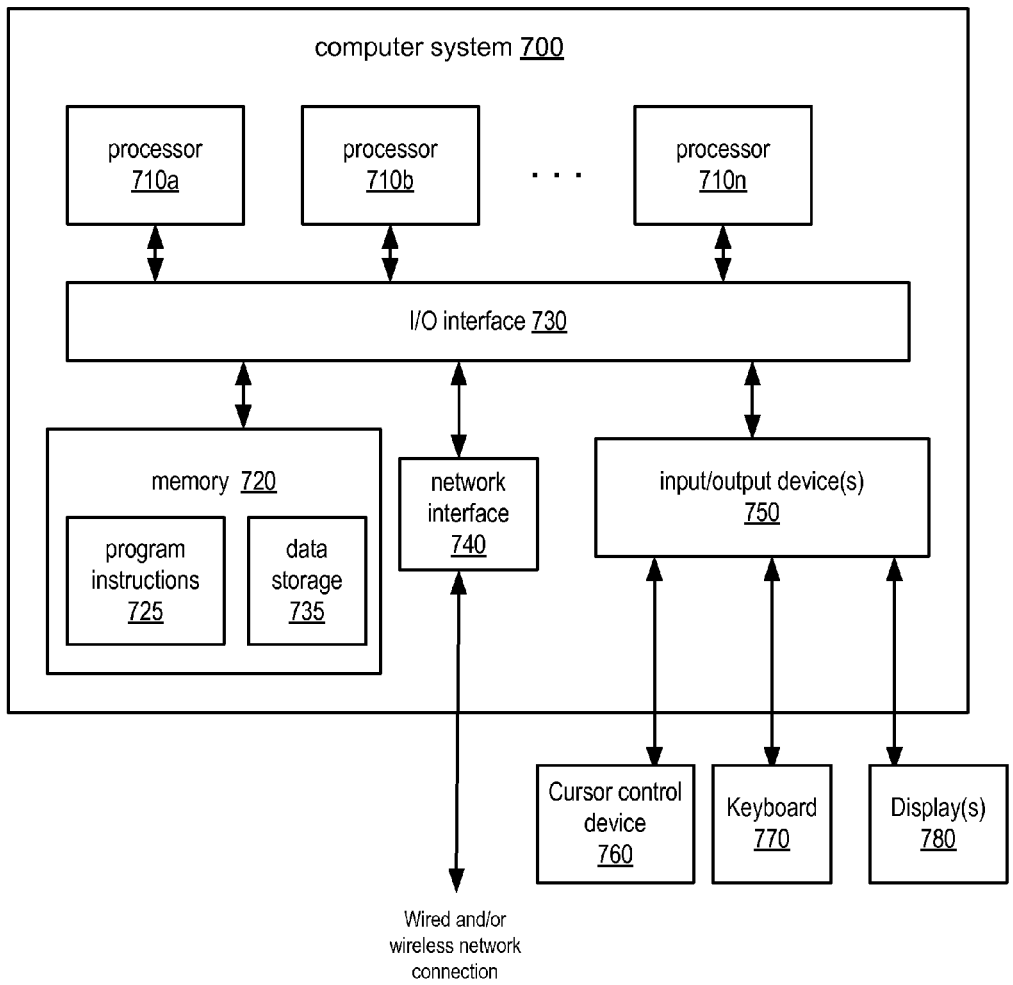
FIG. 13 illustrates an exemplary computer system on which embodiments may be implemented.

FIG. 1 is a high-level block diagram illustrating the electronic transfer of a fixed amount of funds from a source account to a destination account in response to a user interaction with a user interface element to a computer software program, according to one embodiment. Computer software program 102 may be an application or module installed and run on a user's personal or business computing device (referred to herein as a client device). FIG. 13 illustrates an exemplary system that may be used as a client device. Program 102 may include software that enables the program 102 to initiate a transaction over a network 210 via the client device's network interface. Alternatively, program 102 may be a network-based ("online", or remote) program, application or service that provides a user interface to user 200's client device remotely via a network 210, for example via a web browser or web application on the client device. Program 102 may typically be a desktop (local) or network-based (remote) financial software program such as a personal finance application, small business finance application, tax preparation application, or banking application that provides online access to the user's accounts at one or more financial institutions. However, embodiments may be applied to other types and categories of computer software programs.

In one embodiment, the source account 222 for the electronic funds transfer may be a checking account, and the destination account 224 for the electronic funds transfer may be a savings account, but in various embodiments one or both accounts may be different types of accounts. In addition, while embodiments are generally described as transferring funds from a source account 222 to a destination account 224 at a single financial institution, embodiments may also be used to transfer funds from a source account 222 at one financial institution to a destination account 224 at a different financial institution. Furthermore, while embodiments are generally described as transferring funds from a source account 222 of a user 200 to a destination account 224 of the user 200, embodiments may also be used to transfer funds from a source account 222 of the user 200 to a destination account 224 of another entity.

In embodiments, by performing a single interaction with a user interface element 106 provided by a user interface to a computer program 102, a user 200 may initiate a transfer of a fixed amount from a source account 222 (e.g., a checking account) to a destination account 224 (e.g., a savings account). As an example, in one embodiment, a user 200 selection or activation of a user interface element 106 on a client device to launch or log in to an application, service, program or web site may initiate the transfer of the fixed amount from the source account 222 to the destination account 224. For example, in one embodiment, a transfer of funds may be initiated in response to detecting user 200 selecting a "log in" button provided by a user interface to the application, service, program or web site on the client device by clicking on the button. As another example, in one embodiment, a transfer of funds may be initiated in response to detecting user 200 selection of a user interface item (e.g., double-clicking on a desktop icon, or selection of a menu item) configured to open, launch, initiate, or start up the application, service, program, or web site on the client device. As another example, in one embodiment, a user interface element 106, such as a button or menu item, may be configured as a "save now" user interface element that, when selected or otherwise activated by the user 200, initiates a transfer of funds from source account 222 to destination account 224. In one embodiment, the user interface element 106 may include an indication of the amount that will be transferred upon selection of the user interface element 106; for example, the user interface element 106 may display the text "Save $[amount] Now".

In some embodiments, two or more user interface elements 106 may be provided that enable the user 200 to selectively initiate the transfer of different amounts. For example, in one embodiment, two or more "Save $[amount] Now" user interface elements 106 may be displayed, with each user interface element 106 specifying a different amount (e.g., $1, $5, $10, etc.). In some embodiments, rather than a fixed amount being automatically transferred upon each selection of a particular user interface element 106 preconfigured to initiate the transfer of that fixed amount, the user 200 may be allowed to select or specify an amount to be transferred in response to selection of the user interface element 106. For example, in one embodiment, selection of the user interface element 106 may initiate the display of a user interface mechanism (e.g., a popup menu) via which the user 200 may select an amount to be transferred from a list or menu of amounts (e.g., $1, $5, $10, $25, $50, or $100). Thus, in some embodiments, the user interface element 106 may not be preconfigured to transfer a fixed amount, but instead may provide two or more amounts that the user 200 may select from. In some embodiments, other methods for determining an amount to be transferred upon selection of user interface element 106 may be used.

While embodiments are generally described as initiating a transfer of funds in response to selection of a user interface element 106 (a single user interaction with a user interface), some embodiments, or some transactions in an embodiment, may involve more than one user interaction with a user interface. For example, one embodiment may prompt user 200 to confirm the transaction before the funds transfer transaction is actually committed, thus allowing user 200 to selectively confirm or cancel funds transfer transactions, but possibly requiring user 200 to click two or more times to initiate a funds transfer. However, in general, a single action by user 200 may be sufficient to initiate a transfer of funds (a single transaction).

As mentioned above, embodiments may be directed at transferring fixed, relatively small amounts of money from a source account 222 to a destination account 224. For example, embodiments may be configured to transfer $0.50, $1, $2.50, $5, $10, $25, or any other dollar amount automatically in response to the single user interaction with the user interface. Note that dollars are used herein by way of example; other denominations of or types of money (e.g., Euros) may be transferred between accounts when and where applicable. Also note that while the amount in embodiments is indicated above as being "relatively small", in various embodiments larger amounts than those given by way of example may be designated to be transferred in response to a user interaction.

In one embodiment, in response to a single user interaction with a user interface element 106 provided by a user interface to program 102 (e.g., an application, service, program or web page on a client device), a funds transfer transaction 212 may be generated and transmitted to one or more computer systems of the financial institution (referred to herein as financial institution system(s) 220) over a network 210, for example over the Internet. FIG. 13 illustrates an exemplary system that may be used as a financial institution computer system. The transmission may be a wired or wireless transmission. The funds transfer transaction 212 may include one or more of, but is not limited to, information identifying the user (e.g., via a user identifier, name, or other identifying information or a combination thereof), information identifying the source 222 and destination 224 accounts (e.g., account numbers of the accounts), an amount to be transferred (e.g., the fixed amount, further described below), and date and time information. Appropriate security may be applied to the funds transfer transaction 212 when transmitting the transaction over the network 210. For example, the transaction 212 may be encrypted, or the transmission of the transaction 212 may be otherwise secured.

In response to receiving the funds transfer transaction 212, the financial institution system(s) 220 may perform the transfer of the indicated amount of funds from the indicated source account 222 to the indicated destination account 224. In one embodiment, confirmation of the successful transfer (or, if necessary, indication that the transfer cannot be performed for some reason) may be communicated back to user 200's client device via the network 210. In one embodiment, a user interface to program 102 may provide visual or other feedback to user 200 indicating the results of the transfer to the destination (e.g., savings) account 224. For example, in one embodiment, a user interface element may display the current amount of funds in the user's destination (e.g., savings) account 224, and the displayed amount may be updated to indicate the new amount in account 224 after the transfer.

In embodiments, each time the user 200 activates or selects the user interface element 106 provided by the user interface to program 102 on a client device, a new funds transfer transaction 212 is generated and transmitted to the financial institution system(s) 220. For example, if the user interface element 106 is a "log in" user interface element, each time the user logs in to program 102, a funds transfer is initiated. As another example, if the user interface element 106 is a "save now" button displayed after the user 200 has logged into program 102, each time the user 200 activates (e.g., clicks on or otherwise selects) the user interface element 106, a funds transfer is initiated. In one embodiment, the funds transfer may then be performed without prompting the user for confirmation. In another embodiment, the user 200 may be prompted to confirm the funds transfer before the transaction is actually committed, thus allowing a user 200 to selectively confirm or cancel initiated funds transfers. In one embodiment, the user may be given the option to perform funds transfers without prompting for confirmation or with prompting for confirmation.

In one embodiment, the automatic transferal of a fixed amount of funds from source account 222 to destination account 224 may be provided as a default or optional service or program through an online application or service. For example, a financial institution, or an online banking service, may allow a user to agree to or sign up for an "easy savings" feature that provides a user interface element 106 (e.g., a "save now" or login user interface element) via a user interface to an online application of the financial institution or online banking service that allows the user 200 to save a specified amount each time the user 200 selects the user interface element 106. Each time the user selects or activates the user interface element 106, a funds transfer transaction 212 is generated and transmitted to initiate the transfer of the fixed amount (e.g., $5) from the user's checking account (account 222) to the user's savings account (account 224). The financial institution or online banking service may already have account and other information for the user 200, since user 200 has a user account or is signing up or creating a user account for accessing the online application, and so may not need user 200 to specify the source and destination accounts. The financial institution or online banking service may specify a fixed amount (e.g., $5 or $10) or optionally may allow user 200 to specify the amount to be transferred in each transaction, or to select from a list or menu of amounts (e.g., $1, $5, $10, $25, $50, or $100).

In some embodiments, a user 200 may be required to or may optionally set up or change a configuration for the funds transfer transaction 212 to be initiated at each activation of a user interface element 106. For example, user 200 may specify a source account 222 and a destination account 224, and may specify or select a fixed amount to be transferred in response to each initiated transaction. In one embodiment, the user 200 may be allowed to specify or select which user interface element(s) 106 or which user actions the user wants to be configured to initiate a funds transfer transaction. For example, in one embodiment, the user 200 may be given an option to have each login initiate a funds transfer transaction or to have a "save now" button on a page or display (or on each page or display) after login be designated as the transaction initiation mechanism. In one embodiment, user 200 may optionally select to have two or more user interface elements 106 or actions designated as transaction initiation mechanisms. For example, user 200 may be allowed to choose to have a transaction initiated by each login, and to have a "save now" button displayed on an active page or display after login. As another example, there may be two or more "Save $[amount] Now" buttons, with each specifying a different amount (e.g., $1, $5, $10, etc.).

Figure 2:
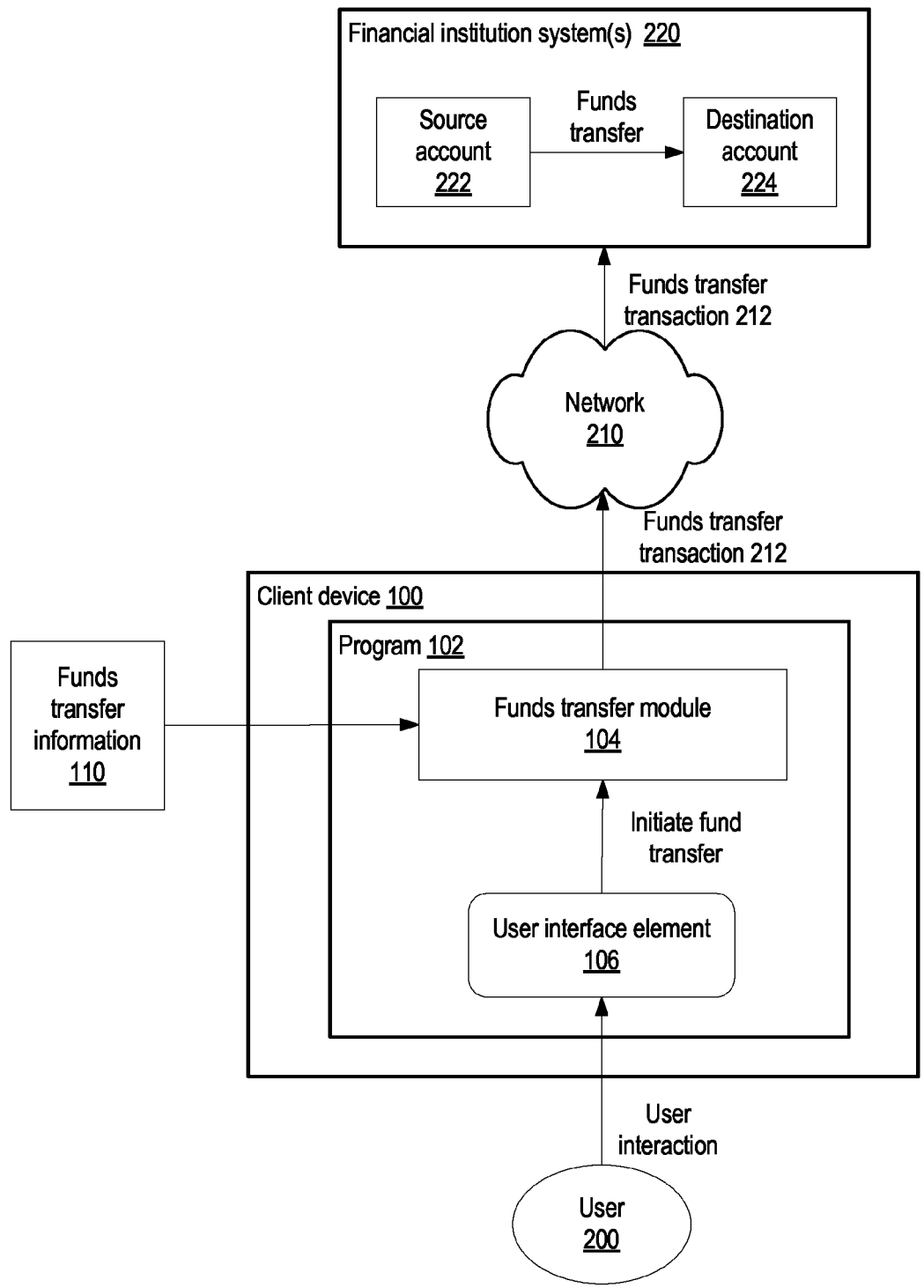
FIG. 2 illustrates an exemplary configuration for, and operation of, a network-based system for the electronic transfer of funds from one account to another account in response to a user interaction with a user interface to a computer software program resident on a client system, according to one embodiment.
Figure 3:
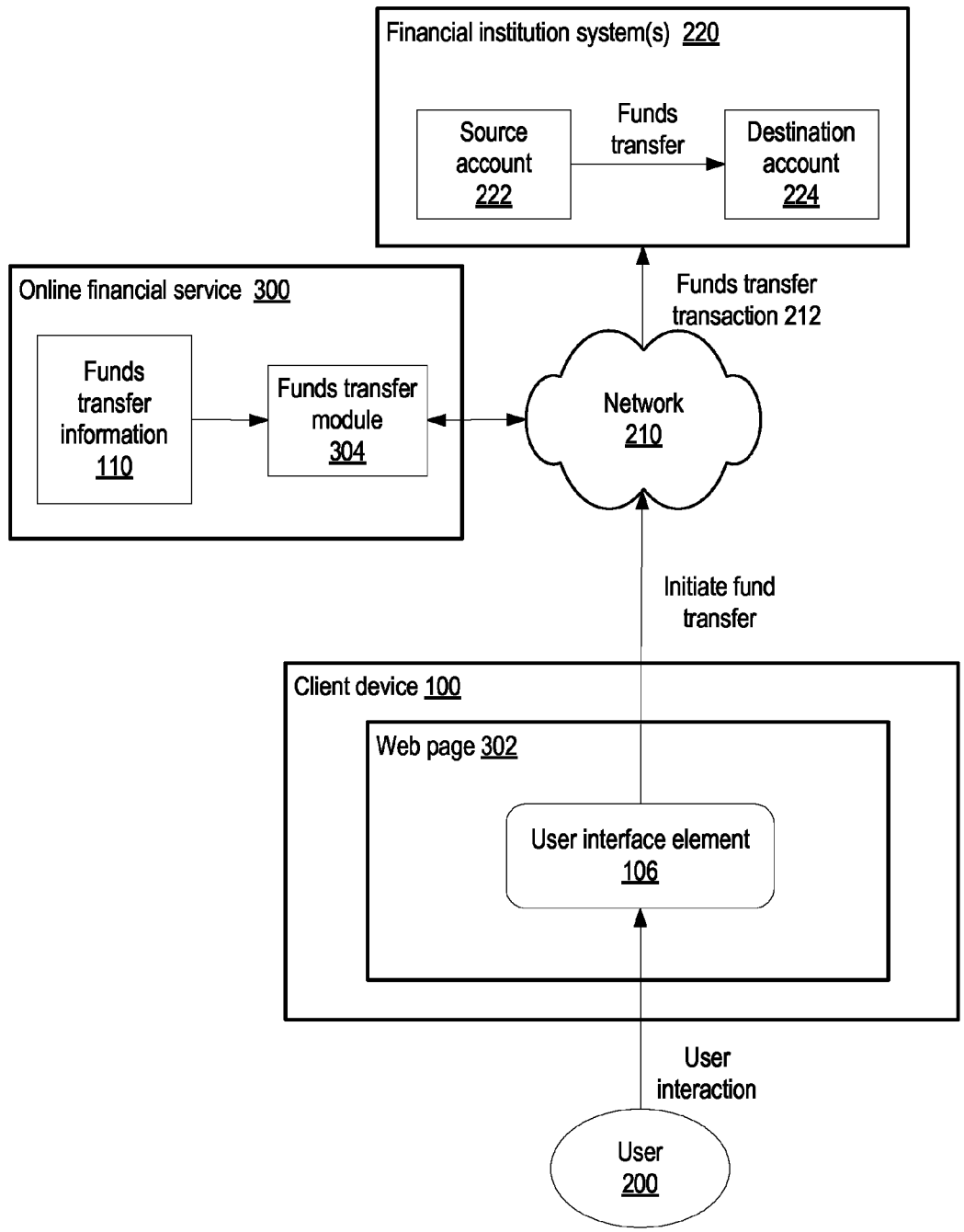
FIG. 3 illustrates an exemplary configuration for, and operation of, a network-based system for the electronic transfer of funds from one account to another account in response to a user interaction with a user interface to an online financial service, according to one embodiment.
Figure 4:
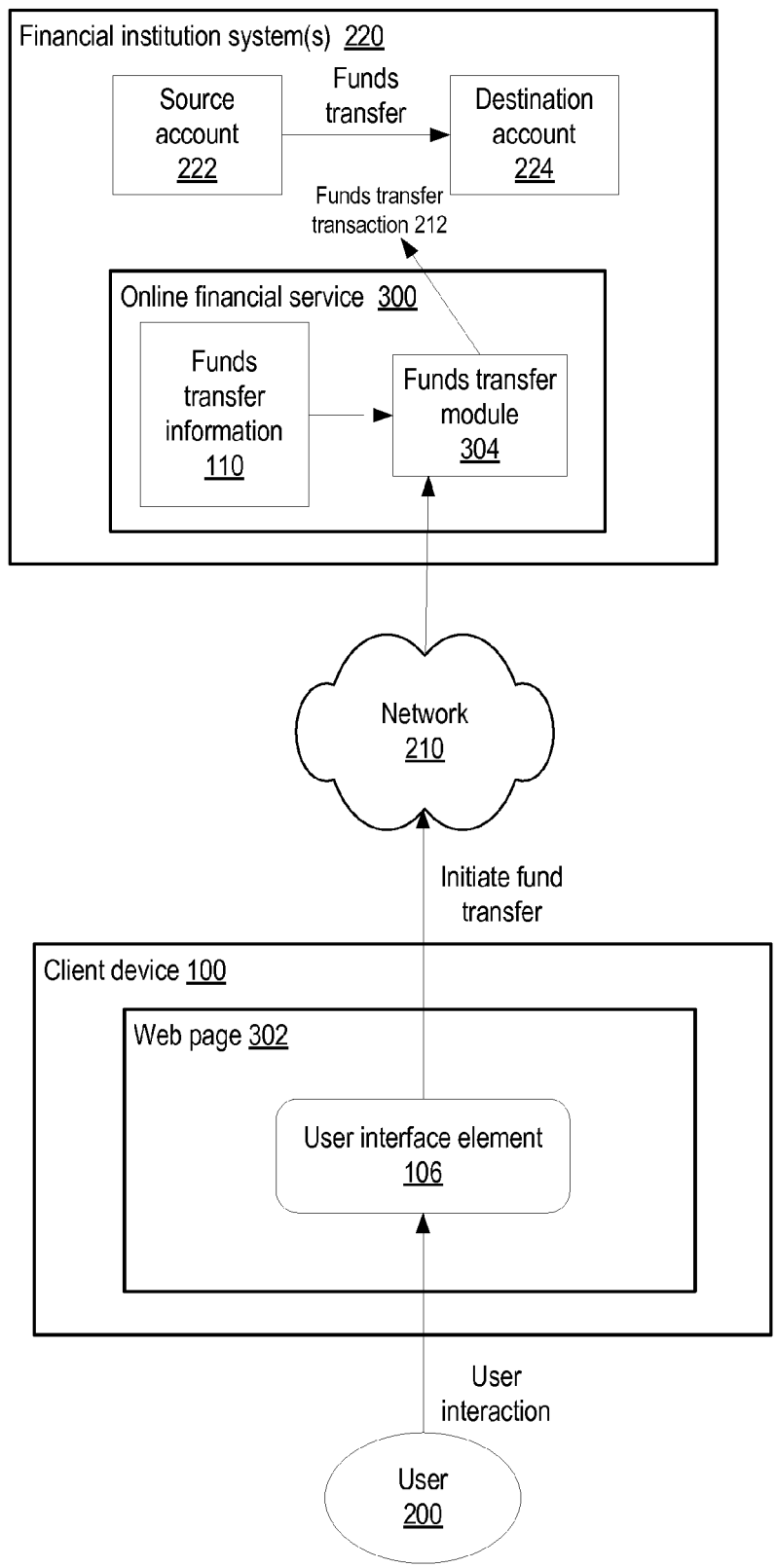
FIG. 4 illustrates an exemplary configuration for, and operation of, a network-based system for the electronic transfer of funds from one account to another account in response to a user interaction with a user interface to an online financial service provided by the financial institution, according to one embodiment.

FIGS. 2 through 4 illustrate exemplary configurations and operations of a network-based system for the electronic transfer of funds from one account to another account in response to a user interaction with a user interface to a computer software program, according to embodiments. FIGS. 2 through 4 are exemplary, and are not intended to be limiting.

FIG. 2 illustrates an exemplary configuration for, and operation of, a network-based system for the electronic transfer of funds from one account to another account in response to a user interaction with a user interface to a computer software program resident on a client system, according to one embodiment. Program 102 may be an application or module installed and run on client device 100. Client device 100 may typically be, but is not limited to, a personal computer (PC) such as a desktop computer, laptop, or notebook computer, a mobile phone, PDA, or any other personal computing device capable of wired or wireless communications over a network 210. FIG. 13 illustrates an exemplary computer system that may be used as a client device 100. Program 102 may include software that enables the program 102 to communicate over a network 210 via client device 100's network interface. Program 102 may typically be a desktop or network-based financial software program such as a personal finance application, small business finance application, tax preparation application, or banking application that provides online access to the user's accounts at one or more financial institutions. However, embodiments may be applied to other types and categories of computer software programs.

In one embodiment, in response to a single user interaction with user interface element 106 provided by a user interface to program 102, a funds transfer transaction 212 may be generated and transmitted to financial institution system(s) 220 over a network 210, for example over the Internet. FIG. 13 illustrates an exemplary system that may be used as a financial institution computer system. In one embodiment, program 102 may include a funds transfer software module 104 that detects the user interaction with user interface element 106 and generates a funds transfer transaction 212. The funds transfer transaction 212 may include one or more of, but is not limited to, information identifying the user 200 (e.g., via a user identifier, name, or other identifying information or a combination thereof), information identifying the source 222 and destination 224 accounts (e.g., account numbers of the accounts), an amount to be transferred (e.g., the fixed amount), and date and time information. To generate and populate the funds transfer transaction 212, funds transfer module 104 of program 102 may access user 200's previously stored funds transfer information 110. Funds transfer information 110 may be generated during a setup phase for using the funds transfer functionality described herein. Funds transfer information 110 may be stored locally on client device 100 or remotely, for example on a server system coupled to network 210. Appropriate security may be applied to the funds transfer transaction 212 when transmitting the transaction over the network 210.

In response to receiving the funds transfer transaction 212, the financial institution system(s) 220 may perform the transfer of the indicated amount of funds from the indicated source account 222 (e.g., a checking account) to the indicated destination account 224 (e.g., a savings account). In one embodiment, confirmation of the successful transfer (or, if necessary, indication that the transfer cannot be performed for some reason) may be communicated back to program 102 on client device 100 via the network 210. In one embodiment, a user interface to program 102 may provide visual or other feedback to user 200 indicating the results of the transfer to the destination (e.g., savings) account 224. For example, in one embodiment, a user interface element may display the current amount of funds in the user's destination (e.g., savings) account 224, and the displayed amount may be updated to indicate the new amount in account 224 after the transfer.

In embodiments, each time user 200 activates or selects user interface element 106, a new funds transfer transaction 212 is generated and transmitted to the financial institution system(s) 220.

FIG. 3 illustrates an exemplary configuration for, and operation of, a network-based system for the electronic transfer of funds from one account to another account in response to a user interaction with a user interface to an online financial service, according to one embodiment. Online financial service 300 may be a network- or web-based application or service provided to users via network 210 than enables online access to accounts at one or more financial institutions. Online financial service 300 may be hosted on one or more computer systems, such as server systems. FIG. 13 illustrates an exemplary system that may be used to host online financial service 300.

Client device 100 may typically be, but is not limited to, a personal computer (PC) such as a desktop computer, laptop, or notebook computer, a mobile phone, PDA, or any other personal computing device capable of wired or wireless communications over a network 210. FIG. 13 illustrates an exemplary computer system that may be used as a client device 100.

Client device 100 may include software that enables the user 200 to access online financial service 300 over network 210. For example, client device 100 may include a web browser that is configured to display a web site and web pages provided by the online financial service 300. As another example, client device 100 may include a web application for accessing online financial service 300 over network 210. FIG. 3 shows web page 302 as an example of a user interface to online financial service 300.

In one embodiment, in response to a single user interaction with user interface element 106 provided by a user interface to online financial service 300, a funds transfer transaction 212 may be generated and transmitted to financial institution system(s) 220 over network 210. FIG. 13 illustrates an exemplary system that may be used as a financial institution computer system. Appropriate security may be applied to the funds transfer transaction 212 when transmitting the transaction over the network 210.

The funds transfer transaction 212 may include one or more of, but is not limited to, information identifying the user 200 (e.g., via a user identifier, name, or other identifying information or a combination thereof), information identifying the source 222 and destination 224 accounts (e.g., account numbers of the accounts), an amount to be transferred (e.g., the fixed amount), and date and time information.

In one embodiment, online financial service 300 may include a funds transfer software module 304 that detects the user interaction with user interface element 106 and generates a funds transfer transaction 212. In one embodiment, to generate and populate the funds transfer transaction 212, funds transfer module 204 may access user 200's previously stored funds transfer information 110. Funds transfer information 110 may be generated during a setup phase for using the funds transfer functionality described herein. Funds transfer information 110 may be stored locally at online financial service 300 or remotely, for example on a separate server system coupled to network 210. In another embodiment, at least a portion of funds transfer information 110 may be communicated to online financial service 300 from client system 100 with the funds transfer initiation information.

In response to receiving the funds transfer transaction 212 from online financial service 300, the financial institution system(s) 220 may perform the transfer of the indicated amount of funds from the indicated source account 222 (e.g., a checking account) to the indicated destination account 224 (e.g., a savings account). In one embodiment, confirmation of the successful transfer (or, if necessary, indication that the transfer cannot be performed for some reason) may be communicated back to client device 100 via the network 210. In one embodiment, web page 302 may provide visual or other feedback to user 200 indicating the results of the transfer to the destination (e.g., savings) account 224. For example, in one embodiment, a user interface element may display the current amount of funds in the user's destination (e.g., savings) account 224, and the displayed amount may be updated to indicate the new amount in account 224 after the transfer.

In embodiments, each time user 200 activates or selects user interface element 106, a new funds transfer transaction 212 is generated and transmitted to the financial institution system(s) 220.

FIG. 4 illustrates an exemplary configuration for, and operation of, a network-based system for the electronic transfer of funds from one account to another account in response to a user interaction with a user interface to an online financial service provided by the financial institution, according to one embodiment. Online financial service 300 may be a network- or web-based application or service hosted on financial institution system(s) 220 and provided to users via network 210 than enables online access to accounts at the financial institution. Operation of the exemplary embodiment illustrated in FIG. 4 is similar to that of the exemplary embodiment illustrated in FIG. 3, except that funds transfer transaction 212 may be, but is not necessarily, transmitted on a local network such as a Local Area Network rather than across the public internet.

FIGS. 5 through 9 illustrate exemplary user interfaces that may be used in a network-based system for the electronic transfer of funds from one account to another account in response to a user interaction with the user interface, according to embodiments. FIGS. 5 through 9 are exemplary, and are not intended to be limiting.

Figure 5:
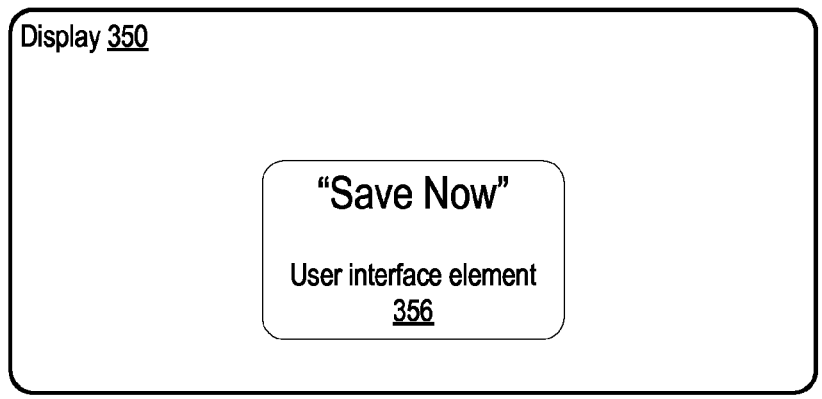
FIG. 5 illustrates an exemplary user interface that provides a "save now" user interface element that may be used in a network-based system for the electronic transfer of funds from one account to another account in response to a user interaction with the user interface element, according to one embodiment.

FIG. 5 illustrates an exemplary user interface that provides a "save now" user interface element that may be used in a network-based system for the electronic transfer of funds from one account to another account in response to a user interaction with the user interface element, according to one embodiment. Display 350 may, for example, be a display provided by a program resident on a client device, such as program 102 illustrated in FIG. 2, or a display provided as an interface to a remote program or application, such as online financial service 300 illustrated in FIGS. 3 and 4. In the latter case, display 350 may, for example, be a web page hosted by a web site that "fronts", or that provides users access to the services provided by, the online financial service 300. User interface element 356 may be a button, a menu item, or any other type of user-selectable user interface item. A user selection of the user interface element 356, for example by hovering the cursor over the element 356 and clicking on the element using a mouse button, may cause a funds transfer to be initiated, for example as was described above in reference to FIG. 1. In one embodiment, user interface element 356 may include an indication of the amount that will be transferred upon selection of the user interface element 356; for example, a user interface element 356 may display the text "Save $[amount] Now".

Figure 6:
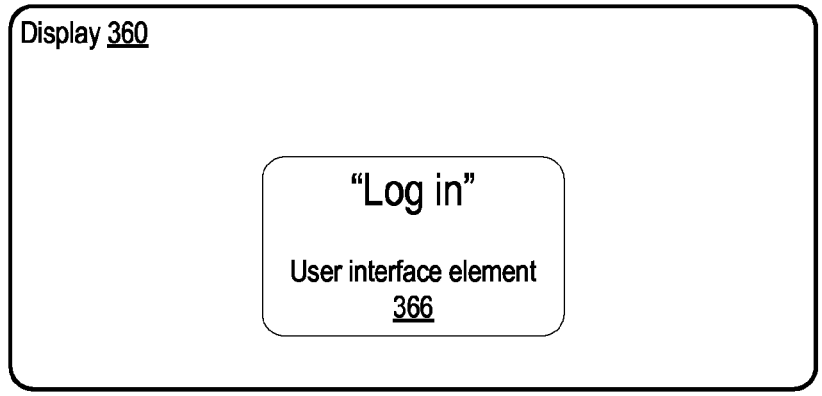
FIG. 6 illustrates an exemplary user interface that provides a "log in" user interface element that may be used in a network-based system for the electronic transfer of funds from one account to another account in response to a user interaction with the user interface element, according to one embodiment.

FIG. 6 illustrates an exemplary user interface that provides a "log in" user interface element that may be used in a network-based system for the electronic transfer of funds from one account to another account in response to a user interaction with the user interface element, according to one embodiment. Display 360 may, for example, be a display provided by a program resident on a client device, such as program 102 illustrated in FIG. 2, or a display provided as an interface to a remote program or application, such as online financial service 300 illustrated in FIGS. 3 and 4. In the latter case, display 360 may, for example, be a web page hosted by a web site that provides users access to the services provided by, the online financial service 300. User interface element 366 may be a button, a menu item, or any other type of user-selectable user interface item. A user selection of the user interface element 366, for example by hovering the cursor over the element 366 and clicking on the item using a mouse button, may, in addition to initiating a login process for the user, cause a funds transfer to be initiated in response to the login event, for example as was described above in reference to FIG. 1.

Figure 7:
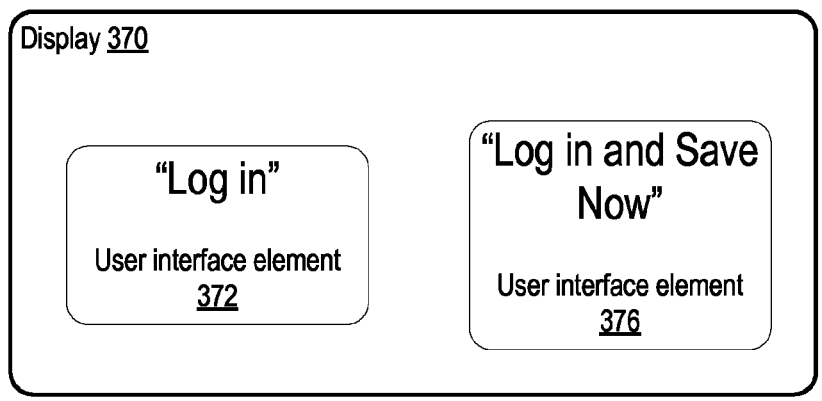
FIG. 7 illustrates an exemplary user interface that provides a "log in and save now" user interface element that may be used in a network-based system for the electronic transfer of funds from one account to another account in response to a user interaction with the user interface element, according to one embodiment.

FIG. 7 illustrates an exemplary user interface that provides a "log in and save now" user interface element that may be used in a network-based system for the electronic transfer of funds from one account to another account in response to a user interaction with the user interface element, according to one embodiment. Display 370 may, for example, be a display provided by a program resident on a client device, such as program 102 illustrated in FIG. 2, or a display provided as an interface to a remote program or application, such as online financial service 300 illustrated in FIGS. 3 and 4. In the latter case, display 370 may, for example, be a web page hosted by a web site that provides users access to the services provided by, the online financial service 300. User interface elements 372 and 376 may be buttons, menu items, or any other type of user-selectable user interface items. A user selection of the user interface element 376, for example by hovering the cursor over the element 376 and clicking on the item using a mouse button, may, in addition to initiating a login process for the user, cause a funds transfer to be initiated in response to the login event, for example as was described above in reference to FIG. 1. A user selection of the user interface element 372 may initiate the login process without initiating a funds transfer. In one embodiment, user interface element 376 may include an indication of the amount that will be transferred upon selection of the user interface element 376; for example, a user interface element 376 may display the text "Log In and Save $[amount]".

Figure 8:
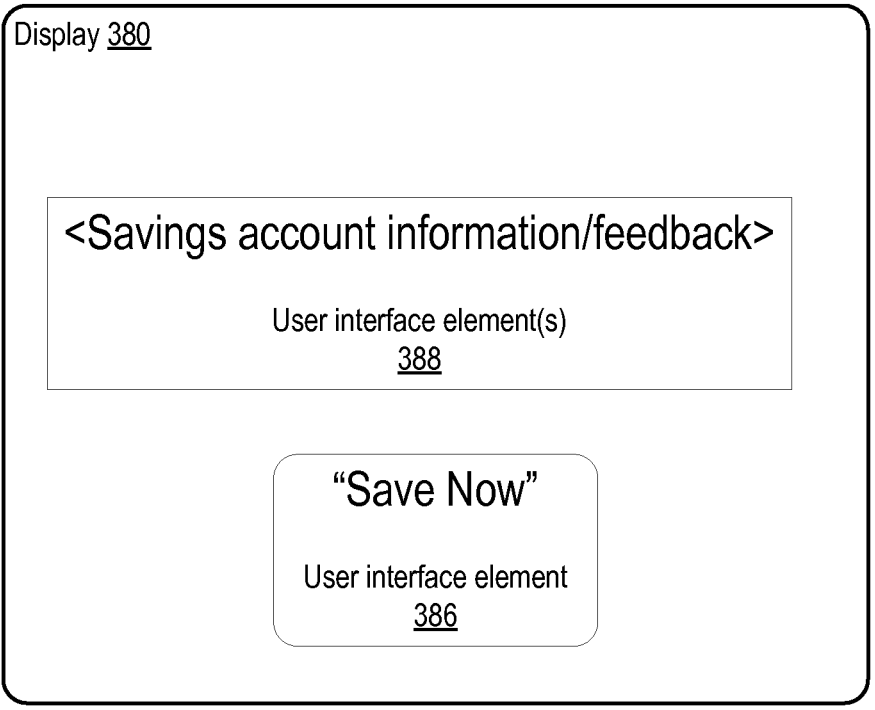
FIG. 8 illustrates an exemplary user interface that provides a "save now" user interface element and a feedback user interface element that may be used in a network-based system for the electronic transfer of funds from one account to another account in response to a user interaction with the user interface element, according to one embodiment.

FIG. 8 illustrates an exemplary user interface that provides a "save now" user interface element and a feedback user interface element that may be used in a network-based system for the electronic transfer of funds from one account to another account in response to a user interaction with the user interface element, according to one embodiment. Display 380 may, for example, be a display provided by a program resident on a client device, such as program 102 illustrated in FIG. 2, or a display provided as an interface to a remote program or application, such as online financial service 300 illustrated in FIGS. 3 and 4. In the latter case, display 380 may, for example, be a web page hosted by a web site that provides users access to the services provided by, the online financial service 300. User interface element 386 may be a button, a menu item, or any other type of user-selectable user interface item. A user selection of the user interface element 386, for example by hovering the cursor over the element 386 and clicking on the item using a mouse button, may cause a funds transfer to be initiated, for example as was described above in reference to FIG. 1. In response to the funds transfer, user interface element 388 may be updated to provide feedback to the user, for example by incrementing a displayed savings account balance to indicate the addition of the money transferred by the funds transfer transaction. Other forms of feedback may be used in various embodiments.

Figure 9:
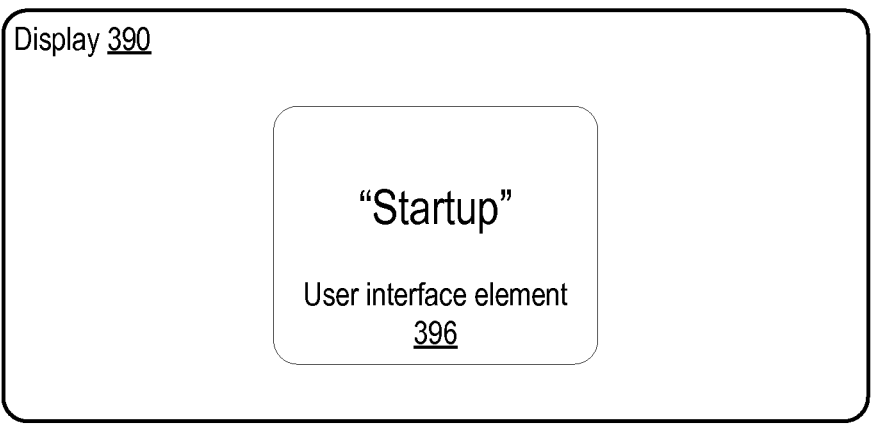
FIG. 9 illustrates an exemplary user interface that provides a "Startup" user interface element that may be used in a network-based system for the electronic transfer of funds from one account to another account in response to a user interaction with the user interface element, according to one embodiment.

FIG. 9 illustrates an exemplary user interface that provides a "Startup" user interface element that may be used in a network-based system for the electronic transfer of funds from one account to another account in response to a user interaction with the user interface element, according to one embodiment. Display 390 may, for example, be the desktop of the client device, or a display provided as an interface to a remote program, application, or service, for example a web page displayed by a browser on the client device and hosted by a web site that provides users access to one or more services provided by an online financial service 300 as illustrated in FIGS. 3 and 4. User interface element 396 may be a button, a menu item, a link, or any other type of user-selectable user interface item configured to "startup" (e.g., launch, startup, initiate, open, access, etc.) a local or remote application, program or service on the client device, or to "startup" a web site or web page (e.g., access the web site or web page via a browser on the client device). A user selection of the user interface element 396, for example by hovering the cursor over the element 366 and clicking on the item using a mouse button, may, in addition to initiating a startup event, cause a funds transfer to be initiated in response to detection of the startup event, for example as was described above in reference to FIG. 1.

Figure 10:
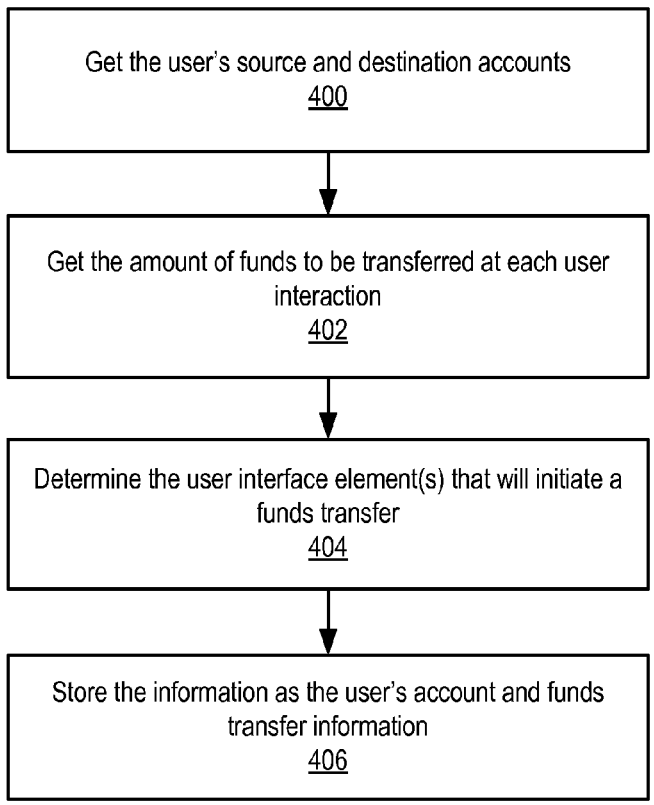
FIG. 10 is a flowchart illustrating an exemplary method for configuring the funds transfer functionality for a user, according to one embodiment.
Figure 11:
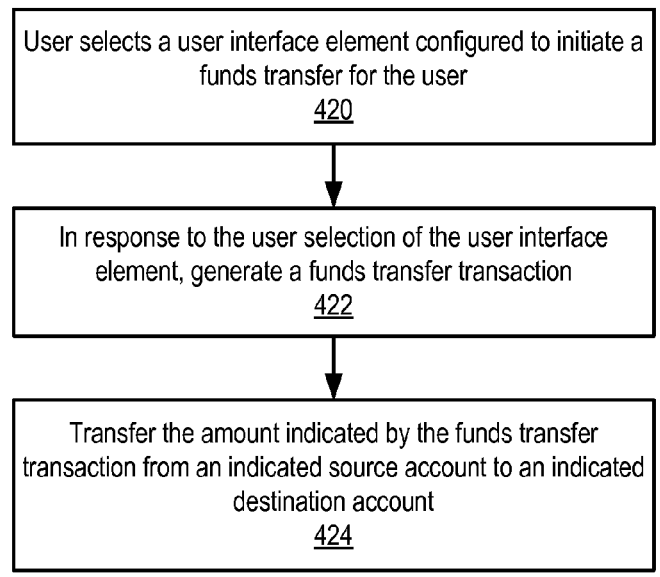
FIG. 11 is a high-level flowchart of a method for the electronic transfer of funds from one account to another account in response to a user interaction with the user interface, according to one embodiment.
Figure 12:
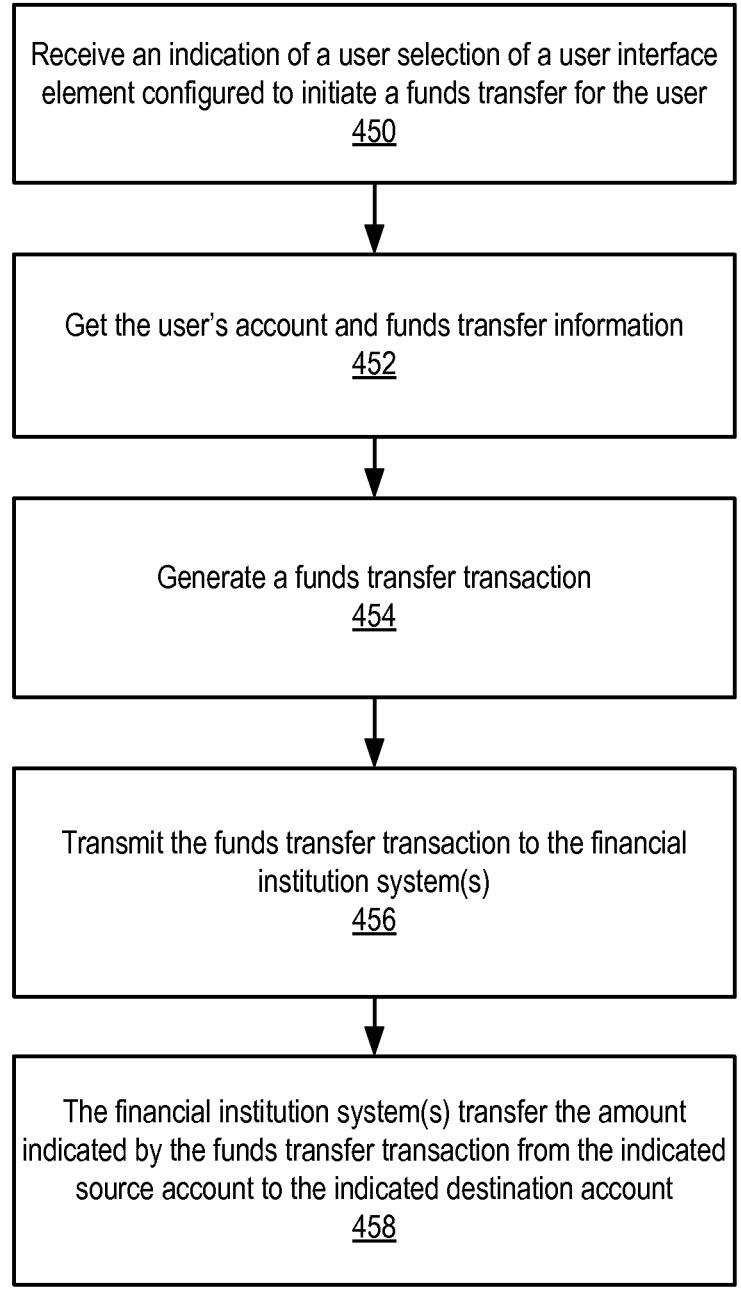
FIG. 12 is flowchart of a method for performing the electronic transfer of funds from one account to another account in response to a user activation of a user interface element, according to one embodiment.

FIGS. 10 through 12 are flowcharts illustrating methods for the electronic transfer of funds from one account to another account in response to a user interaction with the user interface, according to various embodiments. FIGS. 10 through 12 are exemplary and are not intended to be limiting.

FIG. 10 is a flowchart illustrating an exemplary method for configuring the funds transfer functionality for a user, according to one embodiment. A program resident on a client device, such as program 102 illustrated in FIG. 2, or a display (e.g., a web page) provided as an interface to a remote program or application, such as online financial service 300 illustrated in FIGS. 3 and 4, may provide a user interface that allows a user to at least partially configure the funds transfer functionality as described in FIG. 10.

As indicated at 400, information about the user's source and destination accounts may be obtained via the user interface. The user interface may, for example, provide one or more user interface elements that allow the user to enter or select from account numbers representing the source and destination accounts. In one embodiment, if the user's checking and savings account information is already known, then this information may be provided for the user rather than requiring the user to enter the information.

As indicated at 402, the amount of funds to be transferred at each user interaction may be obtained via the user interface. For example, the user interface may provide a text entry user interface element in which the user may enter the desired amount. As another example, the user interface may provide a pop-up menu user interface item from which the user can select a desired amount. Other methods of selecting or specifying an amount may be used in various embodiments. One embodiment may provide or specify a default amount, which the user may change if desired. In another embodiment, a default amount may be provided that may not be changed by the user.

In one embodiment, as indicated at 404, the interaction(s) or user interface element(s) that will be configured to initiate a funds transfer may be determined via the user interface. In another embodiment, one or more specific user interface elements are preconfigured to initiate a funds transfer, and the user is thus not allowed to change or specify user interface element(s).

As indicated at 406, the configuration information obtained via the user interface may be stored as the user's funds transfer information. In one embodiment, the user's funds transfer information may be stored locally on the user's client device. In another embodiment, the user's funds transfer information may be stored remotely, for example in a database associated with a remote program or application, such as online financial service 300 illustrated in FIGS. 3 and 4. In one embodiment, the user's funds transfer information may be stored both locally and remotely.

FIG. 11 is a high-level flowchart of a method for the electronic transfer of funds from one account to another account in response to a user interaction with the user interface, according to one embodiment. As indicated at 420, a user may select a user interface element configured to initiate a funds transfer for the user. For example, the user may hover the cursor over a user interface element, such as a "save now" user interface element illustrated in FIG. 5, and click on the user interface element using a mouse button. As another example, the user may select a menu item from a pulldown or popup menu.

As indicated at 422, in response to the user selection of the user interface element, a funds transfer transaction may be generated. In one embodiment, a funds transfer module may detect the selection of the user interface element. In one embodiment, a software program may include a funds transfer software module that detects the user selection of the user interface element and generates the funds transfer transaction. The program may be an application installed and run on the user's client device, such as program 102 illustrated in FIG. 2. Alternatively, the program may be a network-based ("online") program, application or service, such as online financial service 300 illustrated in FIGS. 3 and 4, that provides a user interface to the user's client device remotely via a network, for example via a web browser or web application on the client device.

As indicated at 424, the amount indicated by the funds transfer transaction may be transferred from an indicated source account to an indicated destination account in response to the funds transfer transaction. In one embodiment, the funds transfer transaction may be transmitted to a financial institution computer system via the network. In response to receiving the funds transfer transaction, the financial institution computer system may perform the electronic transfer of the indicated amount of funds from the indicated source account to the indicated destination account. In one embodiment, confirmation of the successful transfer (or, if necessary, indication that the transfer cannot be performed for some reason) may be communicated back to the user's client device via the network. In one embodiment, visual or other feedback may be provided to the user indicating the results of the transfer to the destination (e.g., savings) account. For example, in one embodiment, a user interface element may display the current amount of funds in the user's destination (e.g., savings) account, and the displayed amount may be updated to indicate the new amount in the account after the transfer.

FIG. 12 is flowchart of a method for performing the electronic transfer of funds from one account to another account in response to a user activation of a user interface element, according to one embodiment. As indicated at 450, an indication of a user selection of a user interface element configured to initiate a funds transfer may be received. In one embodiment, a software program may include a funds transfer software module that receives an indication of the user selection of the user interface element. The program may be an application installed and run on the user's client device, such as program 102 illustrated in FIG. 2. Alternatively, the program may be a network-based ("online") program, application or service, such as online financial service 300 illustrated in FIGS. 3 and 4, that provides a user interface to the user's client device remotely via a network, for example via a web browser or web application on the client device.

As indicated at 452, the user's funds transfer information may be accessed or obtained. To generate and populate a funds transfer transaction, a funds transfer module of the program may access the user's previously stored funds transfer information. The funds transfer information may be generated during a setup phase for funds transfer functionality described herein. The funds transfer information may be stored locally or remotely, for example on a server system coupled to the network.

As indicated at 454, a funds transfer transaction may be generated. The funds transfer transaction may include one or more of, but is not limited to, information identifying the user (e.g., via a user identifier, name, or other identifying information or a combination thereof), information identifying the source and destination accounts (e.g., account numbers of the accounts), an amount to be transferred (e.g., the fixed amount), and date and time information. At least some of this information may be read from the user's funds transfer information.

As indicated at 456, the funds transfer transaction may be transmitted to the financial institution computer system(s) via a network. Appropriate security may be applied to the funds transfer transaction when transmitting the transaction over the network.

As indicated at 458, the financial institution system(s) may transfer the amount indicated by the funds transfer transaction from the indicated source account to the indicated destination account in response to the funds transfer transaction. In response to receiving the funds transfer transaction, the financial institution system(s) may perform the electronic transfer of the indicated amount of funds from an indicated source account to an indicated destination account. In one embodiment, confirmation of the successful transfer (or, if necessary, indication that the transfer cannot be performed for some reason) may be communicated back to the user's client device via the network. In one embodiment, visual or other feedback may be provided to the user indicating the results of the transfer to the destination (e.g., savings) account. For example, in one embodiment, a user interface element may display the current amount of funds in the user's destination (e.g., savings) account, and the displayed amount may be updated to indicate the new amount in the account after the Exemplary System Various components of embodiments of a method and apparatus for automatic savings upon event detection as described herein may be executed on one or more computer systems, which may interact with various other devices. One such computer system is illustrated by FIG. 13. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for the method and apparatus for automatic savings upon event detection, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 13, memory 720 may include program instructions 725, configured to implement at least a portion of embodiments of the method and apparatus for automatic savings upon event detection as described herein, and data storage 735, comprising various documents, tables, databases, etc. accessible by program instructions 725. In one embodiment, program instructions 725 may include software elements of the method and apparatus automatic savings upon event detection illustrated in FIGS. 1 through 12, and data storage 735 may include data used in embodiments. In other embodiments, different software elements and data may be included.

Those skilled in the art will appreciate that computer system 700 is merely illustrative and is not intended to limit the scope of the method and apparatus for automatic savings upon event detection as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   detecting, by a computer system, a selection of a user interface element of a computer software application; and
   in response to detecting the selection of the user interface element:
      the computer system saving a state of the computer software application, wherein saving the state of the computer software application is a primarily action associated with the user interface element, and
      the computer system automatically initiating a transfer of funds from a source account to a destination account, wherein the transfer of funds from the source account to the destination account is a secondary action associated with the user interface element.

2. The computer-implemented method as recited in claim 1, wherein the source account is a checking account, and wherein the destination account is a savings account.

3. The computer-implemented method as recited in claim 1, wherein the computer software application executes on the computer system, and the user interface element is displayed by the computer system to a user.

4. The computer-implemented method as recited in claim 1, wherein the computer software application executes on the computer system, and wherein the user interface element is displayed by a client device that enables remote access to the computer software application via a network.

5. The computer-implemented method as recited in claim 1, wherein the computer software application is a financial software program.

6. The computer-implemented method as recited in claim 1, wherein selection of the user interface element does not change a current context of the computer software application.

7. The computer-implemented method as recited in claim 1, further comprising displaying an indication of the funds transfer to a user.

8. The computer-implemented method as recited in claim 7, wherein the displayed indication of the funds transfer includes the balance of the destination account after the transferal of funds from the source account to the destination account.

9. The computer-implemented method as recited in claim 1, wherein said initiating the transfer of funds from the source account to the destination account comprises:
   transmitting a funds transfer transaction to a financial institution computer system via a network, wherein the funds transfer transaction indicates an amount to be transferred, the source account for the transfer, and the destination account for the transfer;
   wherein a transfer of funds from the source account to the destination account is performed by the financial institution computer system in response to receiving the funds transfer transaction.

10. A system, comprising:
    one or more processors; and
    a memory coupled to the one or more processors, wherein the memory comprises program instructions executable by the one or more processors to:
       detect a selection of a user interface element of a computer software application displayed to a user; and
       in response to detecting the selection of the user interface element:
          save a state of the computer software application, wherein saving the state of the computer software application is a primarily action associated with the user interface element, and
          automatically initiate a transfer of funds from a source account to a destination account by transmitting a funds transfer transaction to a financial institution computer system via a network, wherein the transfer of funds from the source account to the destination account is a secondary action associated with the user interface element.

11. The system as recited in claim 10, wherein the financial institution computer system is configured to transfer the funds from the source account to the destination account in response to receiving the funds transfer transaction.

12. The system as recited in claim 10, wherein the source account is a checking account, and wherein the destination account is a savings account.

13. The system as recited in claim 10, wherein the computer software program is a financial software program.

14. The system as recited in claim 10, wherein the system further comprises a display device, and wherein the user interface element is displayed on the display device.

15. A computer readable storage device comprising program instructions which when executed by a computer system cause the computer system to perform a method, the method comprising:
    detecting a selection of a user interface element of a computer software application displayed to a user; and
    in response to detecting the selection of the user interface element:
       saving a state of the computer software application wherein saving the state of the computer software application is a primarily action associated with the user interface element, and
       automatically initiating a transfer of funds from a source account to a destination account, wherein the transfer of funds from the source account to the destination account is a secondary action associated with the user interface element.

16. The computer readable storage device as recited in claim 15, wherein the source account is a checking account, and wherein the destination account is a savings account.

17. The computer readable storage device as recited in claim 15, wherein the user interface element is a user interface element of a computer software program configured to execute on the computer system.

18. The computer readable storage device as recited in claim 15, wherein the user interface element is displayed by a client device that enables remote access to the computer system via a local interface.

19. The computer readable storage device as recited in claim 15, wherein the program instructions are further computer-executable to implement displaying an indication of the funds transfer on the computer system.

20. A system, comprising:
one or more processors; and
a memory coupled to the one or more processors, wherein the memory comprises program instructions executable by the one or more processors to:
detect a startup event of an application or service, wherein the startup event is a non-financial event; and
initiate a funds transfer transaction in response to said detection of the startup event, wherein the funds transfer transaction indicates the source account for a funds transfer, the destination account for the funds transfer, and a fixed amount to be transferred from the source account to the destination account, wherein the transfer of funds from the source account to the destination account is a secondary action associated with the startup event.

21. The system as recited in claim 20, wherein the program instructions are executable by the one or more processors to initiate a new funds transfer transaction indicating the amount of funds, the source account, and the destination account each time a startup event of the application or service is detected.

22. The system as recited in claim 20, wherein, to initiate a funds transfer transaction, the program instructions are executable by the one or more processors to communicate the funds transfer transaction to a financial institution system configured to perform the funds transfer in accordance with the funds transfer transaction.

23. The system as recited in claim 20, wherein the source account is a checking account, and wherein the destination account is a savings account.

24. The system as recited in claim 20, wherein the application or service is a financial application or financial service.

* * * * *